US010926695B1

(12) United States Patent
Johnson et al.

(10) Patent No.: US 10,926,695 B1
(45) Date of Patent: Feb. 23, 2021

(54) AUTOMOTIVE SAFETY BRAKE LIGHT

(71) Applicants: Stacey Johnson, Olanta, SC (US); Rita Johnson, Olanta, SC (US)

(72) Inventors: Stacey Johnson, Olanta, SC (US); Rita Johnson, Olanta, SC (US)

( * ) Notice: Subject to any disclaimer, the term of this patent is extended or adjusted under 35 U.S.C. 154(b) by 0 days.

(21) Appl. No.: 16/799,961

(22) Filed: Feb. 25, 2020

(51) Int. Cl.
B60Q 1/44 (2006.01)
B60Q 1/46 (2006.01)
F21S 4/28 (2016.01)
B60Q 1/00 (2006.01)
F21S 43/14 (2018.01)
F21Y 115/10 (2016.01)

(52) U.S. Cl.
CPC ........... *B60Q 1/442* (2013.01); *B60Q 1/0094* (2013.01); *B60Q 1/46* (2013.01); *F21S 4/28* (2016.01); *F21S 43/14* (2018.01); *F21Y 2115/10* (2016.08)

(58) Field of Classification Search
None
See application file for complete search history.

(56) References Cited

U.S. PATENT DOCUMENTS

| 5,255,165 | A |  | 10/1993 | Cail |  |
|---|---|---|---|---|---|
| D345,023 | S |  | 3/1994 | Janasiak |  |
| 5,373,426 | A |  | 12/1994 | O'Sullivan |  |
| 5,481,409 | A | * | 1/1996 | Roberts | B60R 1/12 359/839 |
| 5,648,756 | A | * | 7/1997 | Zadok | B60Q 1/302 340/464 |
| 5,758,944 | A |  | 6/1998 | Jandron |  |
| 5,966,073 | A |  | 10/1999 | Walton |  |
| 6,154,126 | A | * | 11/2000 | Beasley | B60Q 1/52 340/468 |
| 6,799,873 | B2 | * | 10/2004 | Fox | B60Q 1/44 362/485 |
| 6,864,787 | B1 |  | 3/2005 | Veach |  |
| 7,417,533 | B2 | * | 8/2008 | Owen | B60Q 1/50 340/465 |
| 9,205,774 | B2 | * | 12/2015 | Kennemer | F21L 14/00 |
| 9,849,830 | B1 | * | 12/2017 | Salter | F21S 43/16 |

(Continued)

FOREIGN PATENT DOCUMENTS

| CN | 101823459 B | * | 12/2013 |
| CN | 204513196 U | * | 7/2015 |
| WO | 1997001457 |  | 1/1997 |

*Primary Examiner* — Chico A Foxx

(57) ABSTRACT

The automotive safety brake light is a supplemental optical signaling system that generates an illumination visible from the exterior of a vehicle. The automotive safety brake light mounts on a rearview mirror such that the field of illumination of the generated illumination is visible from the anterior side of the exterior of the vehicle. The automotive safety brake light generates the visible illumination when a brake signal from the vehicle indicates that the plurality of brake lights have been activated. The automotive safety brake light comprises a circuit housing and a control circuit. The circuit housing contains the control circuit. The control circuit monitors the brake signal. The control circuit initially generates the illumination as a series of pulses when initially actuated by the brake signal. The control circuit subsequently continuously generates a continuous illumination until the brake signal indicates that the plurality of brake lights are no longer illuminated.

15 Claims, 4 Drawing Sheets

(IN-USE VIEW)

(56) References Cited

U.S. PATENT DOCUMENTS

| | | | | |
|---|---|---|---|---|
| D901,049 S | * | 11/2020 | Stowell | D26/31 |
| 2004/0017106 A1 | * | 1/2004 | Aizawa | B60T 7/12 |
| | | | | 303/191 |
| 2005/0174228 A1 | * | 8/2005 | Lin | B62J 6/00 |
| | | | | 340/467 |
| 2007/0150134 A1 | * | 6/2007 | Yamamoto | G08G 1/162 |
| | | | | 701/29.5 |
| 2007/0152805 A1 | * | 7/2007 | Noh | B60T 17/22 |
| | | | | 340/479 |
| 2009/0150017 A1 | * | 6/2009 | Caminiti | G07C 5/008 |
| | | | | 701/23 |
| 2014/0333429 A1 | | 11/2014 | La Rosa | |
| 2015/0194053 A1 | * | 7/2015 | Jensen | G08G 1/005 |
| | | | | 340/944 |
| 2017/0015314 A1 | * | 1/2017 | Tanase | B60T 1/10 |
| 2018/0037158 A1 | * | 2/2018 | Schaye | B60Q 1/2661 |
| 2018/0194347 A1 | * | 7/2018 | Nakagawa | B60W 30/0953 |
| 2018/0201238 A1 | * | 7/2018 | Nakagawa | B60T 8/172 |
| 2019/0061608 A1 | * | 2/2019 | Baledge | B60Q 1/444 |
| 2019/0143886 A1 | * | 5/2019 | Lin | B60Q 1/302 |
| | | | | 362/487 |
| 2019/0210516 A1 | * | 7/2019 | Sata | G08G 1/096775 |
| 2019/0217860 A1 | * | 7/2019 | Kishi | B60W 30/025 |
| 2019/0291577 A1 | * | 9/2019 | Mizuno | B60W 30/12 |
| 2020/0110407 A1 | * | 4/2020 | Miura | B60W 50/14 |

\* cited by examiner (IN-USE VIEW)

(DETAILED VIEW)

AUTOMOTIVE SAFETY BRAKE LIGHT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including signaling devices for a vehicle, more specifically, an optical signal visible from the exterior of a vehicle indicating a braking action. (B60Q1/442)

SUMMARY OF INVENTION

The automotive safety brake light is configured for use with a vehicle. The vehicle further comprises a rearview mirror and a VECU. The vehicle, the rearview mirror and the VECU are defined elsewhere in this disclosure. The VECU further comprises a plurality of brake lights and a brake signal. The plurality of brake lights are signaling lights with a field of illumination that is visible from the posterior side of the exterior of the vehicle. The brake signal is an electric signal used to operate the plurality of brake lights. The automotive safety brake light is a supplemental optical signaling system that generates an illumination visible from the exterior of the vehicle. The automotive safety brake light mounts on the rearview mirror such that the field of illumination of the generated illumination is visible from the anterior side of the exterior of the vehicle. The automotive safety brake light generates the visible illumination when the brake signal of the VECU indicates that the plurality of brake lights have been activated. The automotive safety brake light comprises a circuit housing and a control circuit. The circuit housing contains the control circuit. The control circuit electrically connects to the brake signal. The control circuit initially generates the illumination as a series of pulses when initially actuated by the brake signal. The control circuit subsequently continuously generates a continuous illumination until the brake signal indicates that the plurality of brake lights are no longer illuminated.

These together with additional objects, features and advantages of the automotive safety brake light will be readily apparent to those of ordinary skill in the art upon reading the following detailed description of the presently preferred, but nonetheless illustrative, embodiments when taken in conjunction with the accompanying drawings.

In this respect, before explaining the current embodiments of the automotive safety brake light in detail, it is to be understood that the automotive safety brake light is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automotive safety brake light.

It is therefore important that the claims be regarded as including such equivalent construction insofar as they do not depart from the spirit and scope of the automotive safety brake light. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
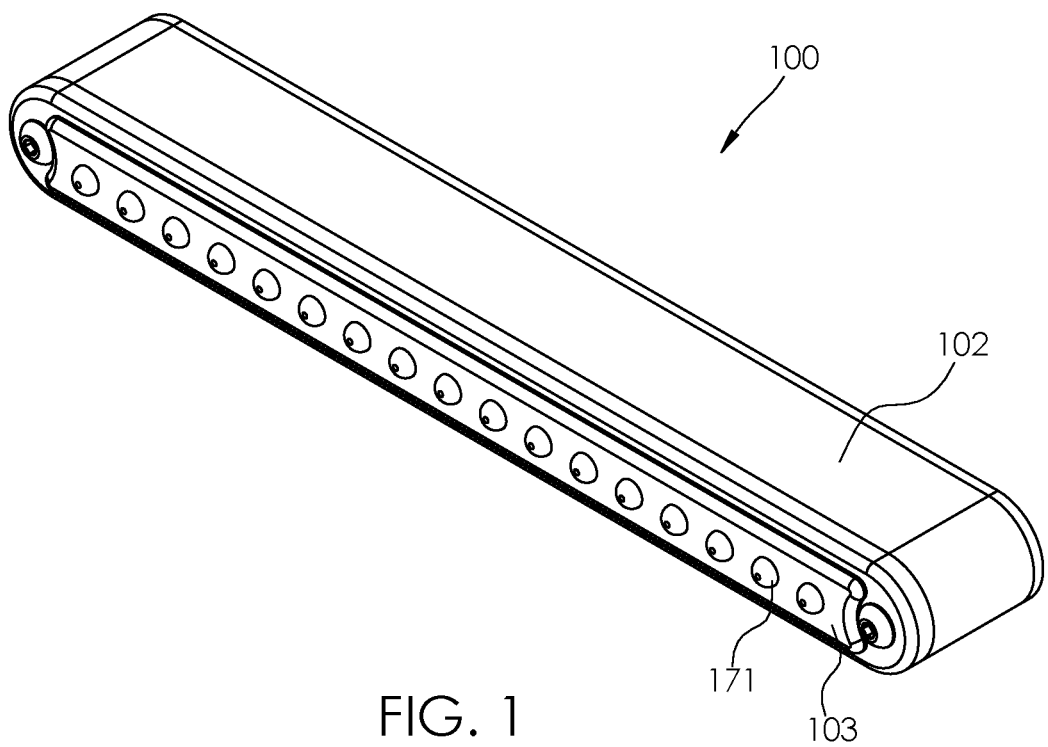
FIG. 1 is a perspective view of an embodiment of the disclosure.
Figure 2:
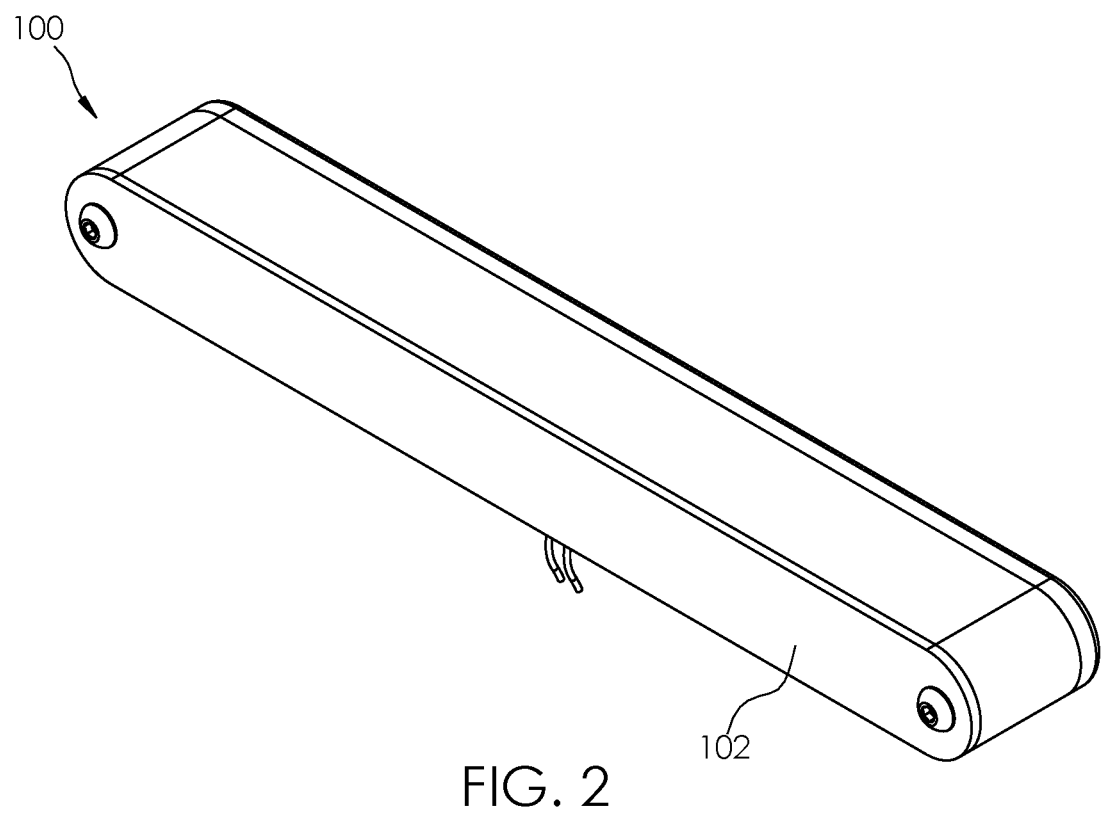
FIG. 2 is a reverse perspective view of an embodiment of the disclosure.
Figure 3:
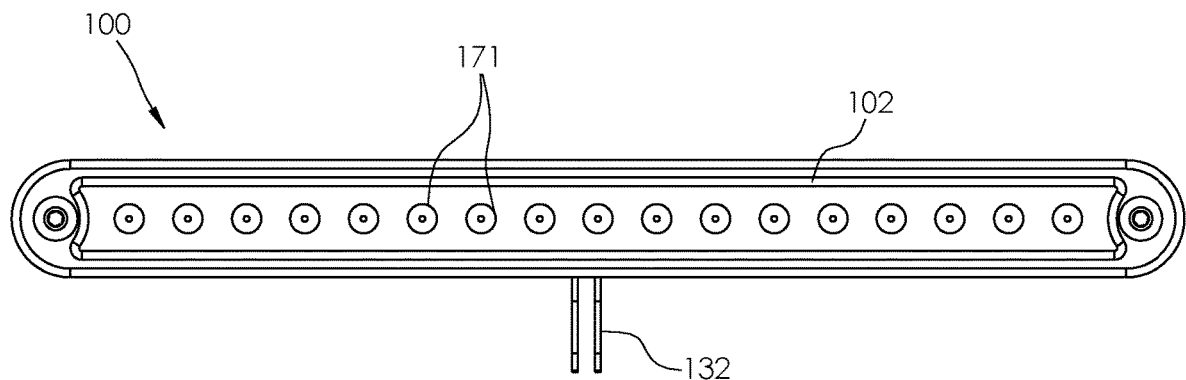
FIG. 3 is a front view of an embodiment of the disclosure.
Figure 4:
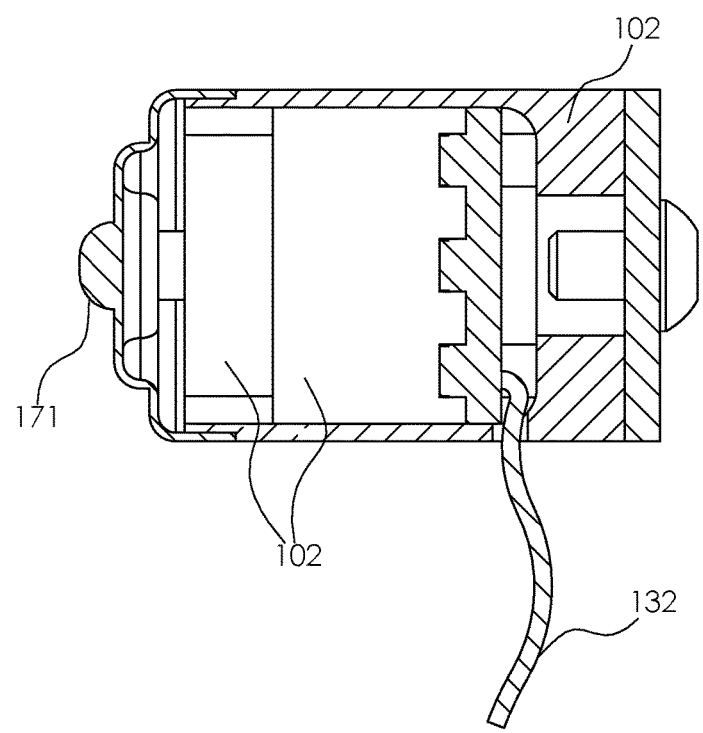
FIG. 4 is a cross-sectional view of an embodiment of the disclosure across X-X as shown in Figure Y.
Figure 5:
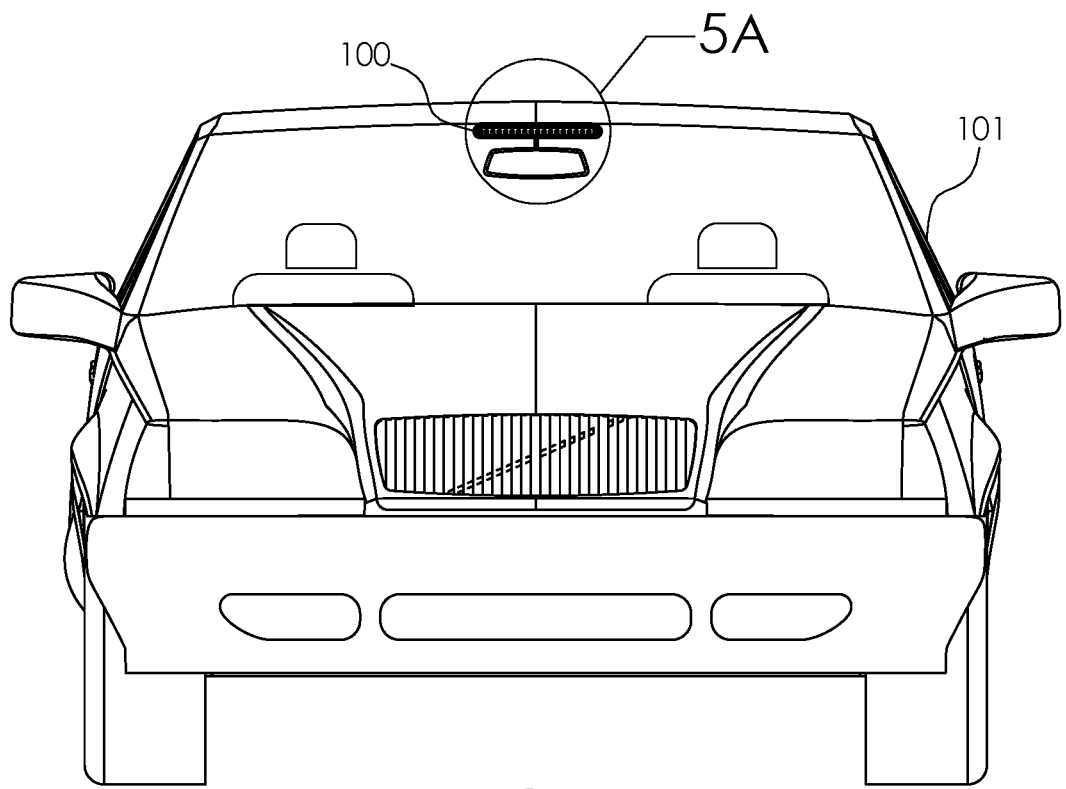
FIG. 5 is an in-use view of an embodiment of the disclosure.
Figure 5A:
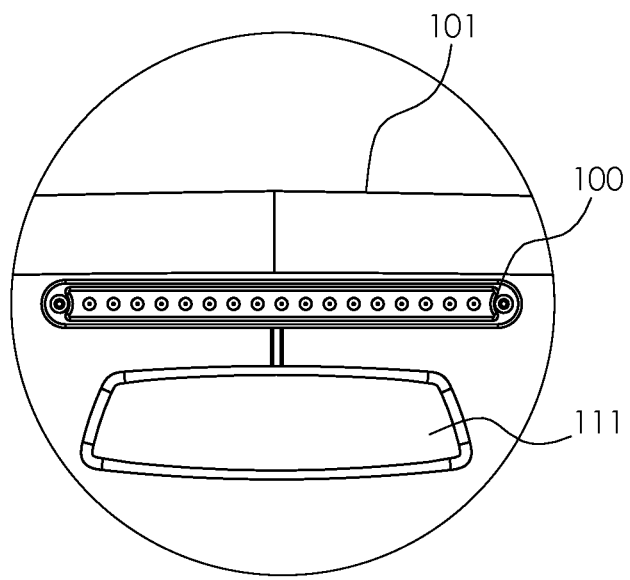
FIG. 5A is a detail view of an embodiment of the disclosure.
Figure 6:
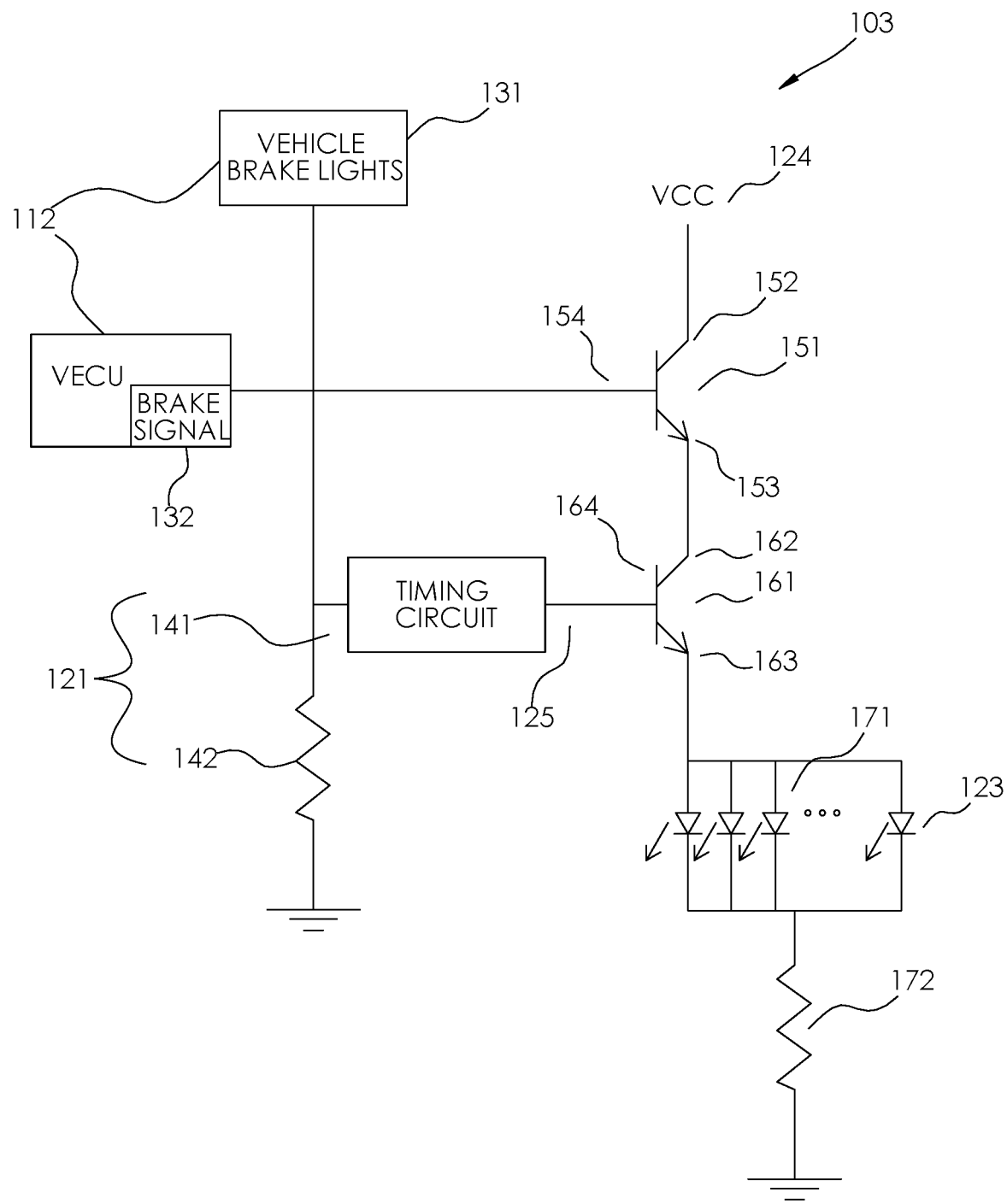
FIG. 6 is a schematic view of an embodiment of the disclosure.

Detailed reference will now be made to one or more potential embodiments of the disclosure, which are illustrated in FIGS. 1 through 6.

The automotive safety brake light 100 (hereinafter invention) is configured for use with a vehicle 101. The vehicle 101 further comprises a rearview mirror 111 and a VECU 112. The vehicle 101, the rearview mirror 111 and the VECU 112 are defined elsewhere in this disclosure. The VECU 112 further comprises a plurality of brake lights 131 and a brake signal 132. The plurality of brake lights 131 are signaling lights with a field of illumination that is visible from the posterior side of the exterior of the vehicle 101. The brake signal 132 is an electric signal used to operate the plurality of brake lights 131.

The invention 100 is a supplemental optical signaling system that generates an illumination visible from the exterior of the vehicle 101. The invention 100 mounts on the rearview mirror 111 such that the field of illumination of the generated illumination is visible from the anterior side of the exterior of the vehicle 101. The invention 100 generates the visible illumination when the brake signal 132 of the VECU 112 indicates that the plurality of brake lights 131 have been activated. The invention 100 comprises a circuit housing 102 and a control circuit 103. The circuit housing 102 contains the control circuit 103. The control circuit 103 electrically connects to the brake signal 132. The control circuit 103 initially generates the illumination as a series of pulses when initially actuated by the brake signal 132. The control circuit 103 subsequently continuously generates a continuous illumination until the brake signal 132 indicates that the plurality of brake lights 131 are no longer illuminated.

The vehicle 101 is defined elsewhere in this disclosure. The rearview mirror 111 is defined elsewhere in this disclosure. The VECU 112 is defined elsewhere in this disclosure.

The control circuit 103 electrically connects to the VECU 112 brake signal 132. The VECU 112 refers to the vehicle 101 engine control unit. The VECU 112 is provisioned as part of the vehicle 101 electrical system. The VECU 112 brake signal 132 is a switched electrical voltage which is actuated when the brake system of the vehicle 101 is actuated, thereby illuminating the plurality of brake lights 131. As shown most clearly in FIG. 6, the VECU 112 brake signal 132 electrically connects to the pull-down resistor 142 of the timing device 121. The actuation of the brake signal 132 causes the pull-down resistor 142 to present a voltage to both the first base 154 of the first transistor 151 and the timing circuit 141 that initiates the operation of the control circuit 103.

The circuit housing 102 is a rigid structure. The circuit housing 102 contains the control circuit 103. The circuit housing 102 is formed with all apertures and form factors necessary to allow the circuit housing 102 to accommodate the use, the operation, and the external connections of the control circuit 103. Methods to form a circuit housing 102 suitable for the purposes described in this disclosure are well-known and documented in the mechanical arts.

The circuit housing 102 mounts on the rearview mirror 111 of the vehicle 101. The position of the circuit housing 102 on the rearview mirror 111 is such that the illumination of the generated by the control circuit 103 will be visible when viewed from the anterior side from the exterior of the vehicle 101.

The control circuit 103 is an electric circuit. The control circuit 103 electrically connects to the VECU 112 of the vehicle 101. The control circuit 103 monitors the brake signal 132 of the VECU 112 of the vehicle 101. The control circuit 103 generates an illumination sequence when the brake signal 132 indicates to the control circuit 103 that the brakes of the vehicle 101 have been actuated such that the plurality of brake lights 131 have been illuminated. By illumination sequence is meant that the control circuit 103 will initially generate a series of pulsed illuminations when the brake signal 132 indicates that the plurality of brake lights 131 have been illuminated. The control circuit 103 will subsequently generate a continuous illumination for as long as the brake signal 132 continues to indicate that the plurality of brake lights 131 have been illuminated. The control circuit 103 will extinguish the generated illumination when the brake signal 132 indicates that the plurality of brake lights 131 have been extinguished.

The control circuit 103 comprises a timing device 121, a switching circuit 122, a lamp circuit 123, and a Vcc 124. The timing device 121, the switching circuit 122, the lamp circuit 123, and the Vcc 124 are electrically interconnected.

The timing device 121 is an electric circuit. The timing device 121 is defined elsewhere in this disclosure. The timing device 121 monitors the brake signal 132 from the plurality of brake lights 131. The timing device 121 generates a series of electric control signals 125 that are transmitted to the switching circuit 122 that initiate and extinguish the lamp circuit 123. The timing device 121 initially generates the electric control signals 125 as a series of individual electric pulses. These individual electric pulses cause the switching circuit 122 to generate the series of pulsed illuminations through the lamp circuit 123. After a previously determined amount of time, the timing device 121 switches to generating a continuous electric control signal 125. The continuous electric control signal 125 causes the switching circuit 122 to generate a continuous illumination through the lamp circuit 123. The timing device 121 further comprises a timing circuit 141 and a pull-down resistor 142.

The timing circuit 141 is an electric circuit. The timing circuit 141 physically generates the electric control signal 125. The timing circuit 141 monitors the brake signal 132. The timing circuit 141 uses the activation of the brake signal 132 to initiate the generation of the electric control signal 125. The timing circuit 141 uses the discontinuation of the brake signal 132 to terminate the generation of the electric control signal 125.

The pull-down resistor 142 is a resistive electric circuit element that is placed in series between the brake signal 132 of the VECU 112 and the electrical ground provided by the vehicle 101. The pull-down resistor 142 is a load resistor that presents the voltage generated by the brake signal 132 to the first transistor 151 and to the timing circuit 141.

The switching circuit 122 is an electric circuit. The switching circuit 122 forms a series electric connection between the Vcc 124 and the lamp circuit 123. The switching circuit 122 receives control signals from the brake signal 132 of the VECU and the electric control signal 125 of the timing device 121. The brake signal 132 enables the overall operation of the switching circuit 122 by controlling the flow of electricity from the Vcc 124 into the switching circuit 122. The electric control signal 125 controls the illumination of the lamp circuit by controlling the flow of electricity from the switching circuit 122 into the lamp circuit 123. The switching circuit 122 comprises a first transistor 151 and a second transistor 161, and a Vcc 124.

The first transistor 151 operates as a switch. The first transistor 151 comprises a first collector 152, a first emitter 153, and a first base 154. When a voltage is applied from the brake signal 132 to the first base 154, electric current will flow into the first base 154 and the first transistor 151 will act like a closed switch allowing electric current to flow from the first collector 152 and through the first emitter 153 into the second collector 162 of the second transistor 161. When the voltage is removed from the first base 154, the first transistor 151 will act like an open switch disrupting electric current flow from the first collector 152 to the first emitter 153. The first transistor 151 effectively operates as the power switch for the lamp circuit 123.

The second transistor 161 operates as a switch. The second transistor 161 comprises a second collector 162, a second emitter 163, and a second base 164. When the electric control signal 125 generated by the timing circuit 141 of the timing device 121 is applied to the second base 164, electric current will flow into the second base 164 and the second transistor 161 will act like a closed switch allowing electric current to flow from the second collector 162 through the second emitter 163 into the lamp circuit 123. When the voltage is removed from the second base 164, the second transistor 161 will act like an open switch disrupting electric current flow from the second collector 162 to the second emitter 163. By coordinating the operation of the lamp circuit 123 with the electric control signal 125 generated by the timing circuit 141, the second transistor 161 controls the illumination sequence generated by the control circuit 103.

The lamp circuit 123 is an electric circuit. The lamp circuit 123 generates an illumination when a voltage is applied across the lamp circuit 123. The lamp circuit 123 electrically connects in series with the switching circuit 122 such that the switching circuit 122 controls voltage across the lamp circuit 123 by controlling the flow of electricity into the lamp circuit 123. The lamp circuit 123 comprises a plurality of LEDs 171 and a limit resistor 172.

Each of the plurality of LEDs 171 is a two terminal semiconducting device that generates illumination. The LED is defined elsewhere in this disclosure. The plurality of LEDs 171 are electrically connected in series with the switching circuit 122 such that when the switching circuit 122 passes electric current into the plurality of LEDs 171, each of the plurality of LEDs 171 will illuminate. The limit resistor 172 is a resistive electric circuit element that is placed in series between the plurality of LEDs 171 electrical ground of the vehicle 101. The limit resistor 172 limits the flow of electricity through the plurality of LEDs 171.

The Vcc 124 is a source of DC electric voltage that is used to power and operate the control circuit 103. The Vcc 124 is provisioned by the VECU 112 of the vehicle 101. The Vcc 124 is defined elsewhere in this disclosure.

The electric control signal 125 is an electric voltage generated by the timing device 121. The electric control signal transmits operating signals from the timing device 121 to the switching circuit 122. The electric control signal 125 electrically connects to the second base 164 of the second transistor 161 of the switching circuit 122.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Bow: As used in this disclosure, the bow refers to the anterior side of an object, vehicle, or vessel. Specifically, the bow refers to the most forward element of the object in the direction of the primary sense of direction of the object vehicle, or vessel.

Diode: As used in this disclosure, a diode is a two terminal semiconductor device that allows current flow in only one direction. The two terminals are called the anode and the cathode. Electric current is allowed to pass from the anode to the cathode.

Electrical Ground: As used in this disclosure, an electrical ground is a common reference voltage that is used in the design and implementation of electrical circuits. An electrical ground is often, but not necessarily, the discharge point of electric currents flowing through an electric circuit.

Field of Illumination: As used in this disclosure, a field of illumination refers to an area illuminated by electromagnetic radiation projected from an electrical device such as a lamp or transmission antenna.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is term that relates a first object to a second object. When the first object is closer to the bow of a vehicle, the first object is said to be forward of the second object. The term is commonly used on vessels and vehicles. See bow, aft, port, starboard, and stern Frequency: As used in this disclosure, frequency is a count of the number of repetitions of a cyclic process that are completed within a previously determined duration.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Illumination: As used in this disclosure, illumination refers to electromagnetic radiation contained with an area. Illumination is a synonym for light, particularly in cases where a measure of the amount of visible electromagnetic radiation in a space is called for.

Inferior: As used in this disclosure, the term inferior refers to a directional reference that is parallel to and in the same direction as the force of gravity when an object is positioned or used normally.

Lamp: As used in this disclosure, a lamp is an electrical circuit that generates (typically visible spectrum) electromagnetic radiation.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Load Resistor: As used in this disclosure, a load resistor is an electrical resistor that is used to present a voltage to an electrical device. The presented voltage is controlled by controlling the amount of electrical current passing through the load resistor.

Mirror: As used in this disclosure, a mirror is a surface that is designed to reflect light with a minimum of dispersion or absorption. A mirror may or may not be formed with curved surfaces that are used to concentrate or disperse the light that reflects off the mirror.

Parallel Circuit: As used in this disclosure, a parallel circuit refers to a method of electrically connecting a plurality of circuit elements to a voltage source. In a parallel circuit each circuit element receives a voltage equal to the full voltage produced by the voltage source.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Pulse: As used in this disclosure, a pulse is a rhythmic signal or stimulus wherein the signal or stimulus has a brief duration.

Pull-Down Resistor: As used in this disclosure, a pull-down resistor is an electrical resistor that is used within a switching circuit or logic circuit: a) as a load resistor to present a predetermined signal voltage to a logic element or switching element; and/or, b) is used as a limit resistor to control the flow of electricity through a circuit element.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rearview Mirror: As used in this disclosure, a rearview mirror is a mirror configured for use with a vehicle. The rearview mounts on the anterior (commonly referred to as the front) windshield of the vehicle such that the operator of the vehicle can look into the rearview mirror to see through the posterior (commonly referred to as the rear) windshield.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Series Circuit: As used in this disclosure, a series circuit refers to a method of electrically connecting a plurality of circuit elements to a voltage source. In a series circuit, the proportion of the voltage received by each individual circuit element is divided proportionally between the plurality circuit elements based on the resistance (or impedance) of each circuit element relative to the total resistance of the plurality of circuit elements. The series circuit forms a linear or loop structure often referred to as a daisy chain.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Switching Circuit: As used in this disclosure, a switching circuit is non-programmable electrical device that receives one or more digital or analog inputs and uses those digital or analog inputs to generate one or more digital or analog outputs.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Vcc: As used in this disclosure, Vcc is an acronym for Voltage at the Common Collector. Technically, the Vcc is the primary power source for an NPN transistor. In this disclosure, the definition of Vcc is more broadly defined to mean a direct current voltage source.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device that is used for transporting passengers, goods, or equipment. The term vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Windshield: As used in this disclosure, a windshield refers to the front and rear window of a vehicle that is intended to shield the occupants of the vehicle from the wind generated by the normal motion of the vehicle. Windscreen is a synonym for windshield.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An automotive safety brake light comprising
a circuit housing and a control circuit;
wherein the circuit housing contains the control circuit;
wherein the automotive safety brake light is configured for use with a vehicle;
wherein the automotive safety brake light is configured to generate an illumination visible from the exterior of the vehicle;
wherein the vehicle further comprises a rearview mirror and a VECU;
wherein the VECU further comprises a plurality of brake lights and a brake signal;
wherein the plurality of brake lights are signaling lights with a field of illumination that is visible from the posterior side of the exterior of the vehicle;
wherein the brake signal is an electric signal used to operate the plurality of brake lights;
wherein the automotive safety brake light mounts on the rearview mirror such that the field of illumination of the generated illumination is visible from the anterior side of the exterior of the vehicle;
wherein the control circuit electrically connects to the VECU brake signal;
wherein the automotive safety brake light generates the visible illumination when the brake signal of the VECU indicates that the plurality of brake lights have been activated;
wherein the circuit housing is a rigid structure;
wherein the circuit housing contains the control circuit;
wherein the circuit housing mounts on the rearview mirror of the vehicle;
wherein the position of the circuit housing on the rearview mirror is such that the illumination generated by the control circuit will be visible when viewed from the anterior side from the exterior of the vehicle;
wherein the control circuit is an electric circuit;
wherein the control circuit monitors the brake signal of the VECU of the vehicle;
wherein the control circuit generates an illumination sequence when the brake signal indicates to the control circuit that the brakes of the vehicle have been actuated such that the plurality of brake lights have been illuminated;
wherein by illumination sequence is meant that the control circuit will initially generate a series of pulsed illuminations when the brake signal indicates that the plurality of brake lights have been illuminated;
wherein the control circuit will subsequently generate a continuous illumination for as long as the brake signal continues to indicate that the plurality of brake lights have been illuminated;
wherein the control circuit will extinguish the generated illumination when the brake signal indicates that the plurality of brake lights have been extinguished;
wherein the control circuit comprises a timing device, a switching circuit, and a lamp circuit, and a Vcc;
wherein the timing device, the switching circuit, the lamp circuit, and the Vcc are electrically interconnected;
wherein the timing device is an electric circuit;
wherein the timing device monitors the brake signal from the plurality of brake lights;
wherein the timing device generates the series of electric control signals that are transmitted to the switching circuit that initiate and extinguish the lamp circuit;
wherein the timing device initially generates the electric control signals as a series of individual electric pulses;
wherein these individual electric pulses cause the switching circuit to generate the series of pulsed illuminations through the lamp circuit;
wherein after a previously determined amount of time, the timing device switches to generating a continuous electric control signal;
wherein the continuous electric control signal causes the switching circuit to generate a continuous illumination through the lamp circuit.

2. The automotive safety brake light according to claim 1
wherein the timing device further comprises a timing circuit and a pull-down resistor;
wherein the pull-down resistor is a load resistor that presents the voltage generated by the brake signal to the switching circuit and to the timing circuit.

3. The automotive safety brake light according to claim 2
wherein the timing circuit is an electric circuit;
wherein the timing circuit physically generates the electric control signal;
wherein the timing circuit monitors the brake signal;

wherein the timing circuit uses the activation of the brake signal to initiate the generation of the electric control signal;

wherein the timing circuit uses the discontinuation of the brake signal to terminate the generation of the electric control signal.

4. The automotive safety brake light according to claim 3 wherein the pull-down resistor is a resistive electric circuit element that is placed in series between the brake signal of the VECU and an electrical ground provided by the vehicle.

5. The automotive safety brake light according to claim 4 wherein the switching circuit is an electric circuit;

wherein the switching circuit forms a series electric connection between the Vcc and the lamp circuit;

wherein the switching circuit receives control signals from the brake signal of the VECU and an electric control signal generated by the timing device;

wherein the brake signal enables the overall operation of the switching circuit by controlling the flow of electricity from the Vcc into the switching circuit;

wherein the electric control signal controls the illumination of the lamp circuit by controlling the flow of electricity from the switching circuit into the lamp circuit.

6. The automotive safety brake light according to claim 5 wherein the lamp circuit generates an illumination when a voltage is applied across the lamp circuit;

wherein the lamp circuit electrically connects in series with the switching circuit such that the switching circuit controls voltage across the lamp circuit by controlling the flow of electricity into the lamp circuit.

7. The automotive safety brake light according to claim 6 wherein the Vcc is a source of dc electric voltage that is used to power and operate the control circuit;

wherein the Vcc is provisioned by the VECU of the vehicle.

8. The automotive safety brake light according to claim 7 wherein the switching circuit comprises a first transistor and a second transistor;

wherein the first transistor operates as a switch;

wherein the first transistor controls the flow of electric current into the second transistor;

wherein the second transistor operates as a switch;

wherein the second transistor controls the flow of electric current into the lamp circuit.

9. The automotive safety brake light according to claim 8 wherein the lamp circuit comprises a plurality of LEDs and a limit resistor;

wherein the limit resistor limits the flow of electricity through the plurality of LEDs.

10. The automotive safety brake light according to claim 9 wherein the pull-down resistor is a load resistor that presents the voltage generated by the brake signal to the second transistor and to the timing circuit.

11. The automotive safety brake light according to claim 10 wherein the first transistor comprises a first collector, a first emitter, and a first base;

wherein when a voltage is applied from the brake signal to the first base, electric current will flow into the first base and the first transistor will act like a closed switch allowing electric current to flow from the first collector and through the first emitter into the second collector of the second transistor;

wherein when the voltage is removed from the first base, the first transistor will act like an open switch disrupting electric current flow from the first collector to the first emitter;

wherein the second transistor comprises a second collector, a second emitter, and a second base;

wherein when the electric control signal generated by the timing circuit of the timing device is applied to the second base, electric current will flow into the second base and the second transistor will act like a closed switch allowing electric current to flow from the second collector through the second emitter into the lamp circuit;

wherein when the voltage is removed from the second base, the second transistor will act like an open switch disrupting electric current flow from the second collector to the second emitter.

12. The automotive safety brake light according to claim 11 wherein the actuation of the brake signal causes the pull-down resistor to present a voltage to the first base of the first transistor.

13. The automotive safety brake light according to claim 12 wherein each of the plurality of LEDs is a two terminal semiconducting device that generates illumination;

wherein the plurality of LEDs are electrically connected in series with the switching circuit such that when the switching circuit passes electric current into the plurality of LEDs, each of the plurality of LEDs will illuminate.

14. The automotive safety brake light according to claim 13 wherein the limit resistor is a resistive electric circuit element that is placed in series between the plurality of LEDs electrical ground of the vehicle.

15. The automotive safety brake light according to claim 14 wherein the electric control signal is an electric voltage generated by the timing device;

wherein the electric control signal transmits operating signals from the timing device to the switching circuit;

wherein the electric control signal electrically connects to the second base of the second transistor of the switching circuit.

* * * * *